United States Patent [19]
Decao et al.

[11] Patent Number: 5,382,275
[45] Date of Patent: Jan. 17, 1995

[54] METHOD FOR FUSION-FORMING AN OPTICAL SIGNAL ATTENUATOR

[75] Inventors: Marco Decao, Cinisello Balsamo; Aurelio Pianciola, Casteggio; Tiziana Tambosso, Milan, all of Italy

[73] Assignee: Sirti S.P.A., Milan, Italy

[21] Appl. No.: 78,439

[22] Filed: Jun. 16, 1993

[30] Foreign Application Priority Data

Jun. 19, 1992 [IT]  Italy ............................ MI92A001521

[51] Int. Cl.⁶ ............................................. C03B 37/23
[52] U.S. Cl. ........................................ 65/407; 385/98; 385/140; 65/382
[58] Field of Search ........................... 65/4.2, 4.21, 29; 385/98, 140

[56] References Cited

U.S. PATENT DOCUMENTS

| | | | |
|---|---|---|---|
| 4,519,671 | 5/1985 | Curtis et al. | |
| 4,557,556 | 12/1985 | Decker | 65/4.21 |
| 4,948,412 | 8/1990 | Yamada et al. | 65/4.21 |
| 5,224,977 | 7/1993 | Anjan et al. | 65/4.21 |

FOREIGN PATENT DOCUMENTS

| | | |
|---|---|---|
| 0144136 | 12/1985 | European Pat. Off. . |
| 3224518 | 5/1984 | Germany . |
| 2128766A | 2/1984 | United Kingdom . |

*Primary Examiner*—Robert L. Lindsay
*Attorney, Agent, or Firm*—Hedman, Gibson & Costigan

[57] ABSTRACT

A method for fusion-forming an optical signal attenuator using a piece of optical fibre, comprising essentially the following steps:

a) fusing the piece of optical fibre;

b) manipulating the piece of optical fibre during fusion;

c) inserting the piece of optical fibre into a mechanical adaptor for connection to two standard connectors butt-coupled respectively to the ends of two optical fibres, wherein the manipulation of the piece of optical fibre during fusion is effected by subjecting the piece of optical fibre to both axial misalignment and angular misalignment.

9 Claims, 4 Drawing Sheets

METHOD FOR FUSION-FORMING AN OPTICAL SIGNAL ATTENUATOR

This invention relates to a method for fusion-forming an optical signal attenuator.

Signal amplification and attenuation problems are of very great importance in fibre optics.

The receiving and transmitting units of telecommunications apparatus based on optical signals are now standardized and are able to accept and receive only signals having a power level lying within a precisely defined range.

As the signals conveyed by the fibres undergo power losses of an extent depending on the length of the connections and the presence of joints and branches, it often happens that points with very different signal power levels exist within one and the same communications network.

There is therefore an urgent requirement to be able to adapt power levels to the sensitivity characteristics of receiving equipment at any point of the network.

For this purpose, various known types of optical signal attenuators are used consisting of a piece of optical fibre with attenuating properties which is able to reduce the power of the transmitted signal by an amount defined during manufacture. Such optical fibre pieces are formed from normal fibres, which are subjected to a process of fusion by controlled electrical discharges and are manipulated mechanically during the fusion.

The physical characteristics and optical properties of the attenuating fibre depend on the type and the extent of the stresses and deformations to which it is subjected during fusion. A serious problem which arises during the construction of attenuators derives from the fact that with known methods it is not possible to obtain an attenuating fibre with which the attenuation remains constant with varying wavelength.

The reason for this is that if a fibre is subjected to axial misalignment during fusion, spectral attenuation is achieved which decreases linearly with increasing wavelength. In contrast, if the fibre is subjected to angular misalignment, spectral attenuation is achieved which increases with wavelength.

As fibre optic communications networks often carry multiplex signals of different wavelengths along the same cable, serious operational consequences can arise if the attenuation does not achieve the proper spectral pattern. In this respect it can happen that some signals of certain wavelengths are insufficiently attenuated, so saturating the receiving units of the telecommunications equipment.

Vice versa it could simultaneously happen that other signals of different wavelength from the preceding are excessively attenuated to a level below the sensitivity threshold of the receiving unit. Another serious problem, which arises in the case of short attenuators of length less than or equal to one centimeter, derives from the fact that the considerable distortions introduced into the fibre deformation cause several radiation and leaky modes to be propagated within the attenuator. These modes rapidly attenuate on the basis of distance, with the exception of the first higher order mode $LP_{11}$, which requires a few centimeters of fibre before it is extinguished. Consequently so-called "intermodal noise" arises at the attenuator output connector due to interference between the first higher mode and the fundamental mode.

An attenuator formed in the center of a long piece of fibre, of length exceeding ten centimeters, does not present the problem of modal noise. However, in many applications it is essential to use small manageable attenuators easy to insert into panels.

An object of the present invention is to provide a method for fusion-forming an optical signal attenuator of the aforesaid the and for the stated applications by which attenuators can be easily formed having constant spectral response, within a narrow tolerance, for the transmitted signal wavelength.

A further object is to provide a method enabling small-dimension attenuators to be formed which do not generate modal noise at the connectors.

These objects are attained by a method for fusion-forming an optical signal attenuator using a piece of optical fibre, comprising essentially the following steps:

a) fusing the piece of optical fibre;

b) manipulating the piece of optical fibre during fusion;

c) inserting the piece of optical fibre into a mechanical adaptor for connection to two standard connectors butt-coupled respectively to the ends of two optical fibres, characterized in that said manipulation of the piece of optical fibre during fusion is effected by subjecting said piece of optical fibre to both axial misalignment and angular misalignment.

Preferably said method is characterized by using a piece of optical fibre having a length of the order of one centimeter, with a thin core and having a cut-off wavelength much lower than the lowest operational wavelength, and with a numerical aperture greater than the numerical aperture of said optical fibres at the operational wavelengths.

The effects of said axial misalignment and of said angular misalignment are usefully monitored by feeding to the input of said piece of optical fibre, during fusion, an optical signal obtained by combining several optical signals of mutually different wavelengths and measuring at the output of said piece of optical fibre the optical signal power at the wavelengths corresponding to said input signals.

Further advantageous characteristics form the subject of the dependent claims.

The functional characteristics and advantages of a method according to the present invention will be more apparent from the description thereof given by way of non-limiting example with reference to the accompanying schematic drawings.

Figure 1:
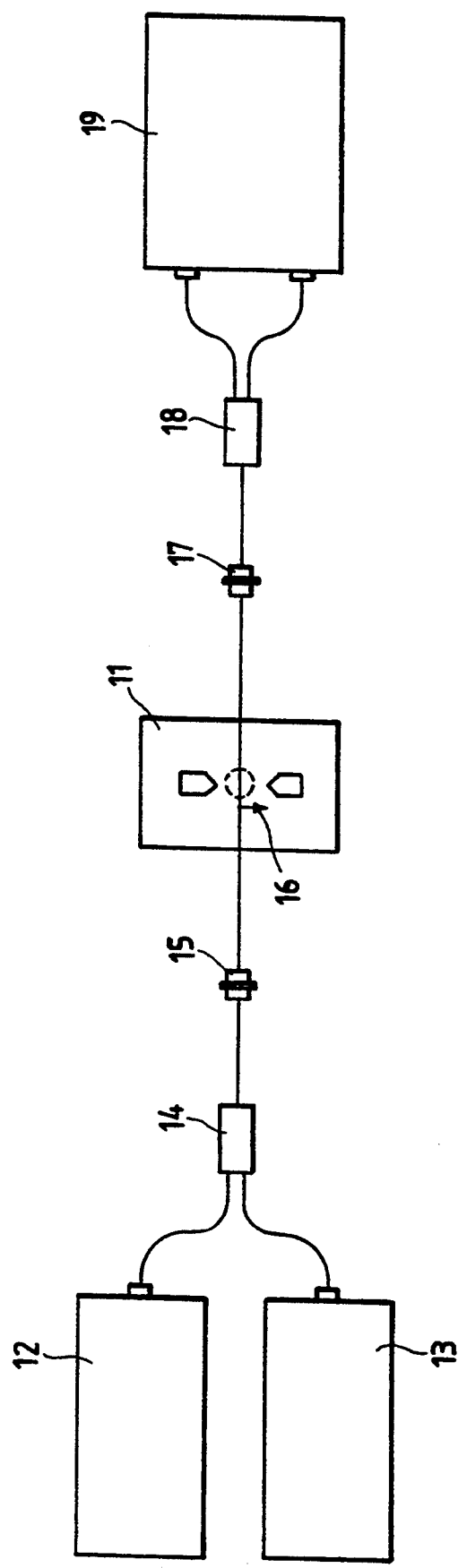
FIG. 1 is a block diagram of a system of manufacture for implementing a method according to the present invention.

With reference to the block diagram of FIG. 1, an apparatus fusing and manipulating optical fibres is indicated overall by 11. The apparatus 11 is controlled by a human operator who subjects an optical fibre to mechanical stress during fusion. Alternatively the apparatus 11 can be controlled by a programmed electronic system.

The outputs of two laser diodes, indicated by 12 and 13 respectively, are connected to two inputs of a wavelength division multiplexer 14. The laser diodes 12 and 13 emit signals of wavelength 1300 nm and 1550 nm respectively.

Alternatively the diodes 12 and 13 are light emitting diodes. The single output of the multiplexer 14 is connected via a connector 15 to one end of a piece 16 of optical fibre inserted into the apparatus 11. The other end of the piece 16 is connected via a connector 17 to the input of a second wavelength division multiplexer 18.

Finally, the two outputs of the multiplexer 18 are connected to two inputs of a two-channel power indicator 19.

To form a fibre with attenuating properties independent of the wavelength of the transmitted signal, the operator proceeds as follows.

When activated, the two laser diodes 12 and 13 transmit signals at two different wavelengths. For telecommunications applications these wavelengths are those at which the fibre used is single-mode, typically 1300 nm and 1550 nm.

The multiplexer 14 combines the two signals emitted by the laser diodes 12 and 13 and simultaneously feeds them to the piece of fibre 16 inserted in the fusion apparatus 11.

The second multiplexer 18 splits the composite signal passing through the piece of fibre 16 into its original components and feeds them separately to tile inputs of the power indicator 19. In this manner the operator can commence the fusion and manipulation of the piece of fibre 16 while observing in real time the powers transmitted by the fibre at the two wavelengths of 1300 nm and 1550 nm.

As axial misalignment results in spectral attenuation which decreases with wavelength and angular misalignment results in spectral attenuation which increases with wavelength, the operator is able to achieve spectral attenuation independent of wavelength by combining axial misalignment with angular misalignment while constantly monitoring the response of the fibre both at low and a high wavelength.

In this manner, by simply superposing the opposing effects of the two types of misalignment, attenuation values can be obtained which vary with wavelength only by a few decibels up or down within the wavelength range of interest (from 1300 nm to 1550 nm). To form an attenuating connection, the piece of fibre 16 is inserted and glued into a mechanical adaptor having a length of the order of one centimeter, the ends of the adaptor being lapped and polished to achieve low-loss connections.

The stated length is however insufficient for the first higher mode to be attenuated by the presence of a refractive index greater than that of the fibre cladding.

Hence modal noise is generated at the output connector because of interference with the fundamental mode.

Figure 2:
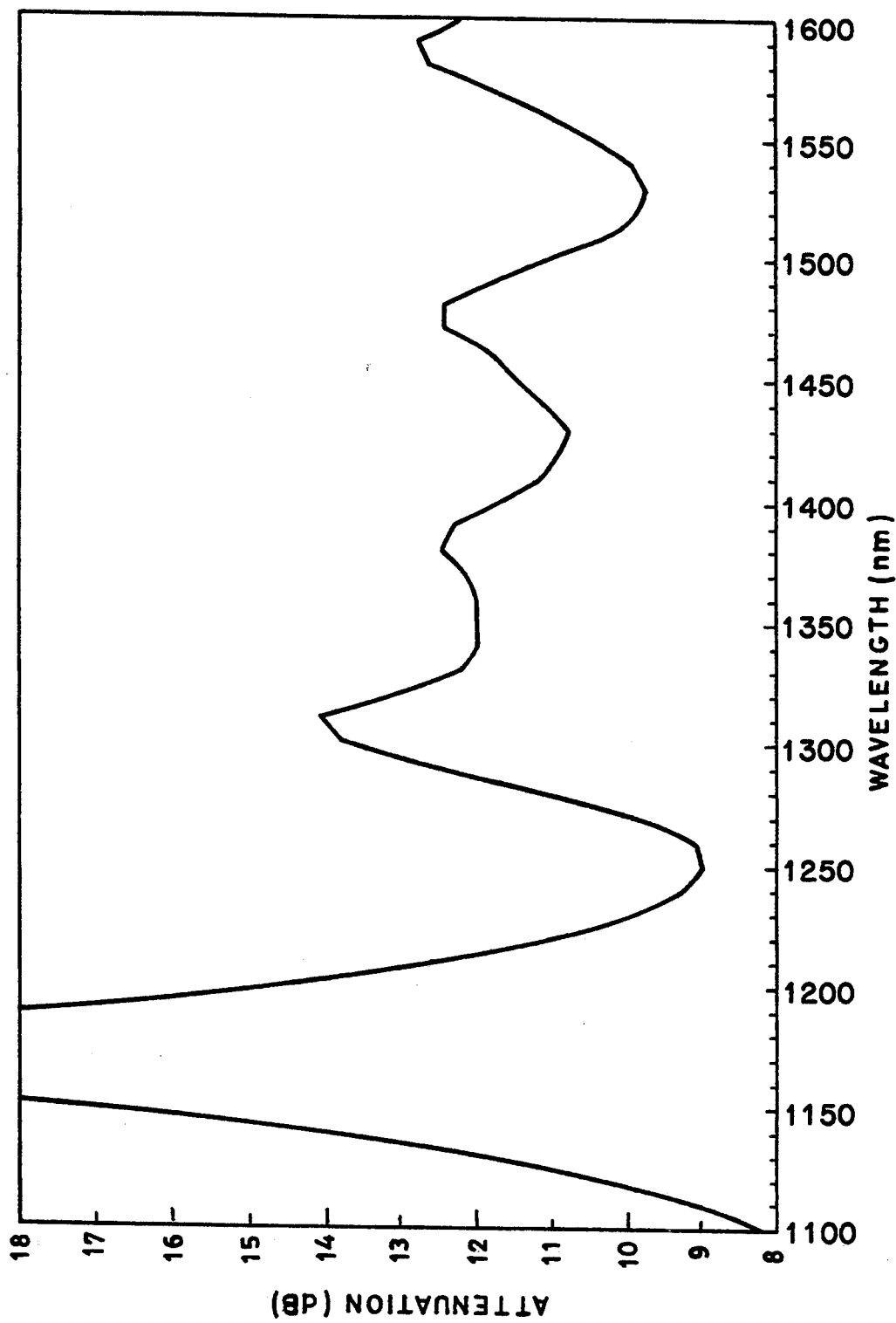
FIG. 2 is a diagram showing attenuation as a function of the wavelength of the signal transmitted by a first attenuator formed by the method of the present invention.

The diagram of FIG. 2 is obtained by experimentally measuring, as a function of wavelength, the power transmitted by a piece 16 formed of fibre identical with that of the optical fibres connected to the attenuator. It can be easily seen that oscillation is present in the spectral response, due to the presence of modal noise, The horizontal axis of the diagram of FIG. 2 represents wavelength expressed in nanometers, and the vertical axis represents attenuation in decibels.

To overcome this drawback it is sufficient to use for the piece 16 an optical fibre having a cut-off wavelength much lower than the lowest operational wavelength and a numerical aperture greater than that of the optical fibres connected to the attenuator. This results in very high attenuation of the first higher mode.

Figure 3:
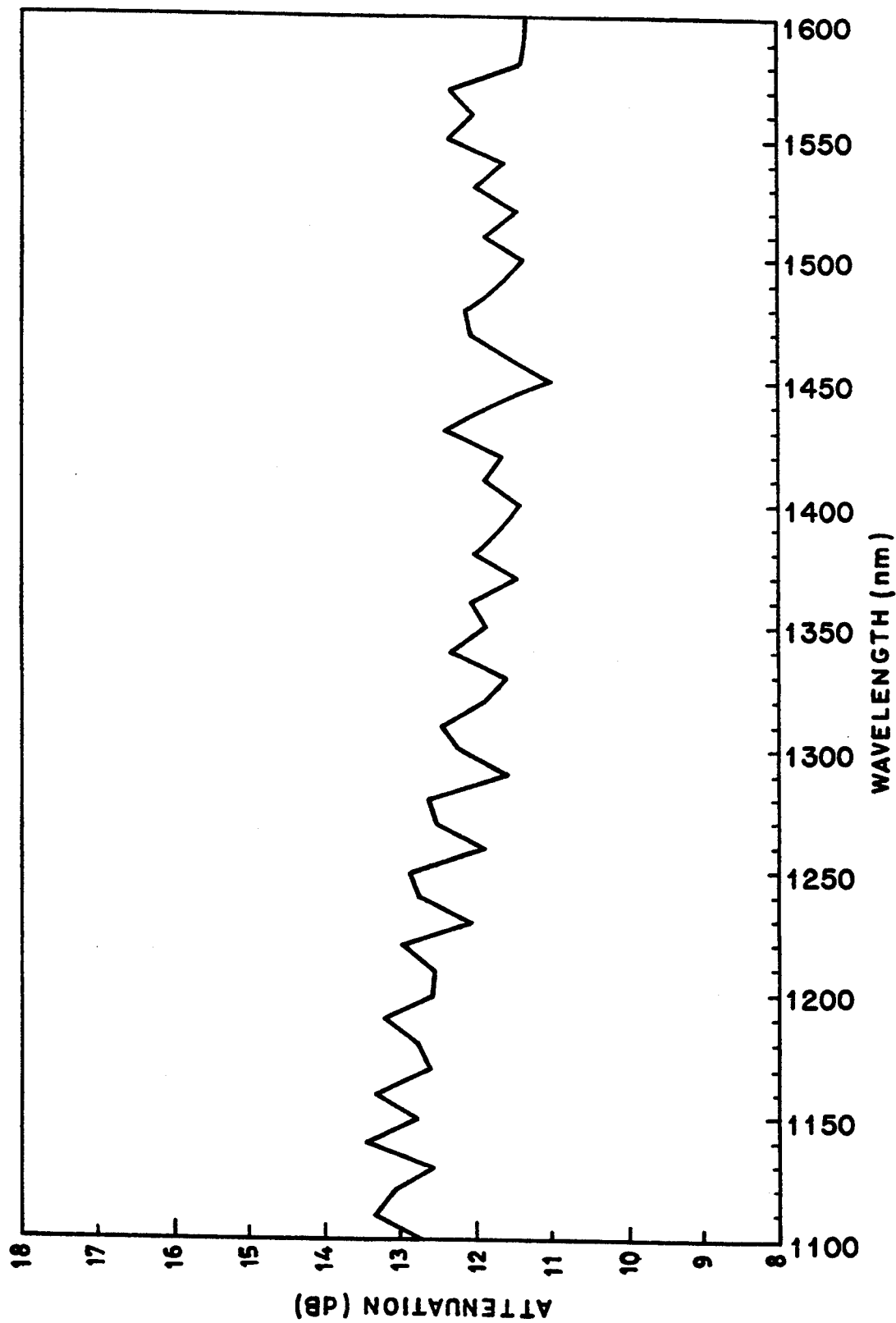
FIG. 3 is a diagram showing attenuation as a function of the wavelength of the signal transmitted by a second attenuator formed by the method of the present invention.

Observing the diagram of FIG. 3, which is similar to the diagram of FIG. 2 but relates to a piece of fibre of low cut-off wavelength and high numerical aperture, it can be seen that the amplitude of the oscillation due to modal noise is greatly reduced.

The coupling losses at the optical fibres connected to the attenuator are minimized by the fact that the fibre used for the piece 16 has a numerical aperture greater than the numerical aperture of a standard single-mode fibre at the typical wavelengths of the application.

Figure 4:
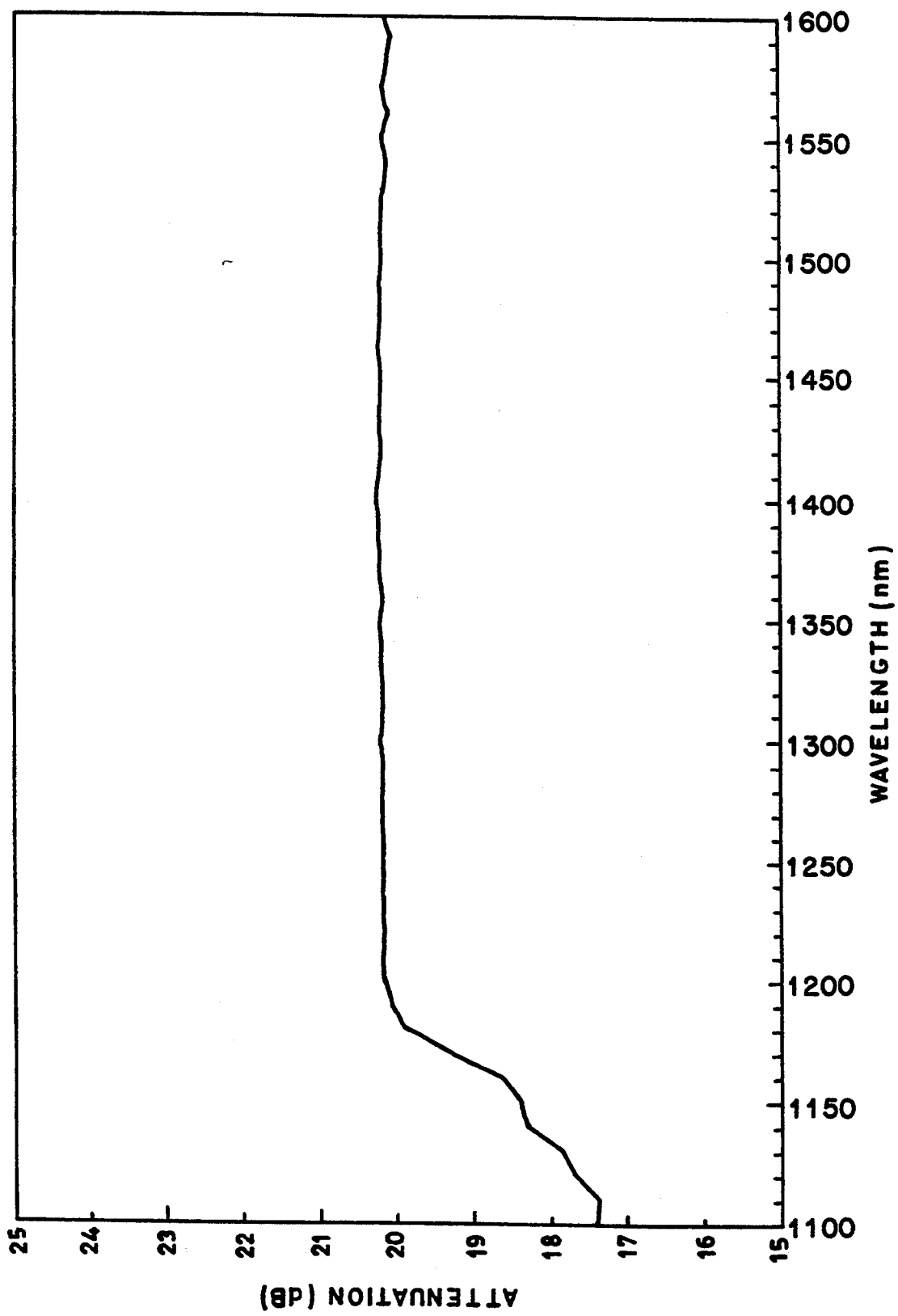
FIG. 4 is a diagram showing attenuation as a function of the wavelength of the signal transmitted by a third attenuator formed by the method of the present invention.

The diagram of FIG. 4 is obtained by experimentally measuring, as a function of wavelength, the power transmitted by a piece 16 formed of fibres identical to the optical fibres connected to the attenuator. The spectral response is flat against wavelength (from the fibre cut-off wavelength onwards) because the piece of fibre is long enough not to present modal noise.

It will be apparent that in this manner a method for fusion-forming attenuators is achieved which besides being very simple, uses apparatus of common use in the applications of interest.

We claim:

1. A method for fusion-forming an optical signal attenuator using a piece of optical fibre, comprising essentially the following steps:
   a) fusing the piece of optical fibre having a length of the order of one centimeter, with a thin core and having a cut-off wavelength much lower than the lowest operational wavelength, and with a numerical aperture greater than the numerical aperture of said optical fibres at the operational wavelengths;
   b) manipulating the piece of optical fibre during fusion;
   c) inserting the piece of optical fibre into a mechanical adaptor for connection to two standard connectors butt-coupled respectively to the ends of two optical fibres, characterized in that said manipulation of the piece of optical fibre during fusion is effected by subjecting said piece of optical fibre to both axial misalignment and angular misalignment.

2. A method for fusion-forming an optical signal attenuator using a piece of optical fibre, comprising essentially the following steps:
   a) fusing the piece of optical fibre having a length of the order of one centimeter, with a thin core and having a cut-off wavelength much lower than the lowest operational wavelength, and with a numerical aperture greater than the numerical aperture of said optical fibres at the operational wavelengths;
   b) manipulating the piece of optical fibre during fusion;
   c) inserting the piece of optical fibre into a mechanical adaptor for connection to two standard connectors butt-coupled respectively to the ends of two optical fibres, characterized in that said manipulation of the piece of optical fibre during fusion is effected by subjecting said piece of optical fibre to both axial misalignment and angular misalignment wherein the effects of said axial misalignment and of said angular misalignment are monitored by feeding to the input of said piece of optical fibre, during fusion, an optical signal obtained by combining several optical signals of mutually different wavelengths lying within the region in which the fibre used is single-mode and measuring at the output of said piece of optical fibre the optical signal power at the wavelengths corresponding to said input signals with a multi-channel optical power indicator with its inputs connected to the outputs of a wavelength-dividing multiplexer with one input and more than one output, said multiplexer input being connected to the output of said piece of fibre said combining of optical signals of mutually different wavelengths being achieved by a wavelength-dividing multiplexer with more than one input and with one output, said optical signals being two optical signals with wavelengths of 1300 nm and 1550 nm respectively.

3. A method as claimed in claim 1, characterized in that the effects of said axial misalignment and of said angular misalignment are monitored by feeding to the input of said piece of optical fibre, during fusion, an optical signal obtained by combining several optical signals of mutually different wavelengths lying within the region in which the fibre used is single-mode and measuring at the output of said piece of optical fibre the optical signal power at the wavelengths corresponding to said input signals.

4. A method as claimed in claim 3, characterized in that said optical signals of mutually different wavelengths are generated by laser diodes.

5. A method as claimed in claim 3, characterized in that said optical signals of mutually different wavelengths are generated by light emitting diodes.

6. A method as claimed in claim 3, characterized in that said combining of optical signals of mutually different wavelengths is achieved by a wavelength-dividing multiplexer with more than one input and with one output.

7. A method as claimed in claim 3, characterized in that said measuring of the optical signal power is effected by a multi-channel optical power indicator with its inputs connected to the outputs of a wavelength-dividing multiplexer with one input and more than one output, said multiplexer input being connected to the output of said piece of fibre.

8. A method as claimed in claim 3, characterized in that said optical signals are two optical signals with wavelengths of 1300 nm and 1550 nm respectively.

9. A method for fusion-forming an optical signal attenuator using a piece of optical fibre, comprising essentially the following steps:
   a) fusing the piece of optical fibre having a length of the order of one centimeter, with a thin core and having a cut-off wavelength lower than the lowest operational wavelength, and with a numerical aperture greater than the numerical aperture of said optical fibres at the operational wavelengths;
   b) manipulating the piece of optical fibre during fusion;
   c) inserting the piece of optical fibre into a mechanical adaptor for connection to two standard connectors butt-coupled respectively to the ends of two optical fibres, characterized in that said manipulation of the piece of optical fibre during fusion is effected by subjecting said piece of optical fibre to both axial misalignment and angular misalignment wherein the effects of said axial misalignment and of said angular misalignment are monitored by feeding to the input of said piece of optical fibre, during fusion, an optical signal obtained by combining several optical signals of mutually different wavelengths lying within the region in which the fibre used is single-mode and measuring at the output of said piece of optical fibre the optical signal power at the wavelengths corresponding to said input signals said optical signal of mutually different wavelengths being generated by laser diodes or by light emitting diodes.

* * * * *